Herbert Müllritter
INVENTOR.

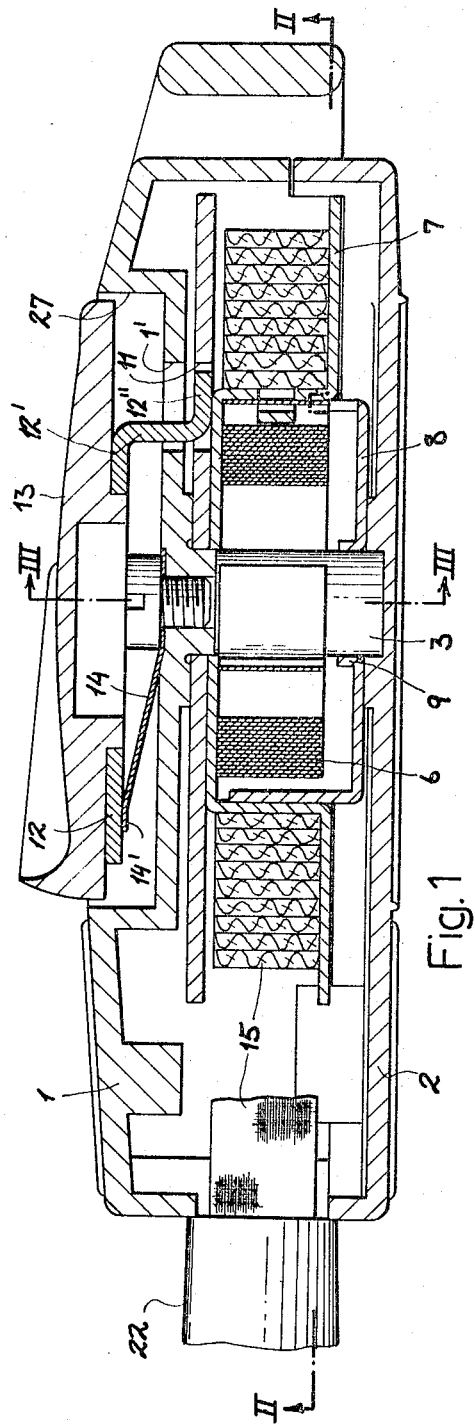
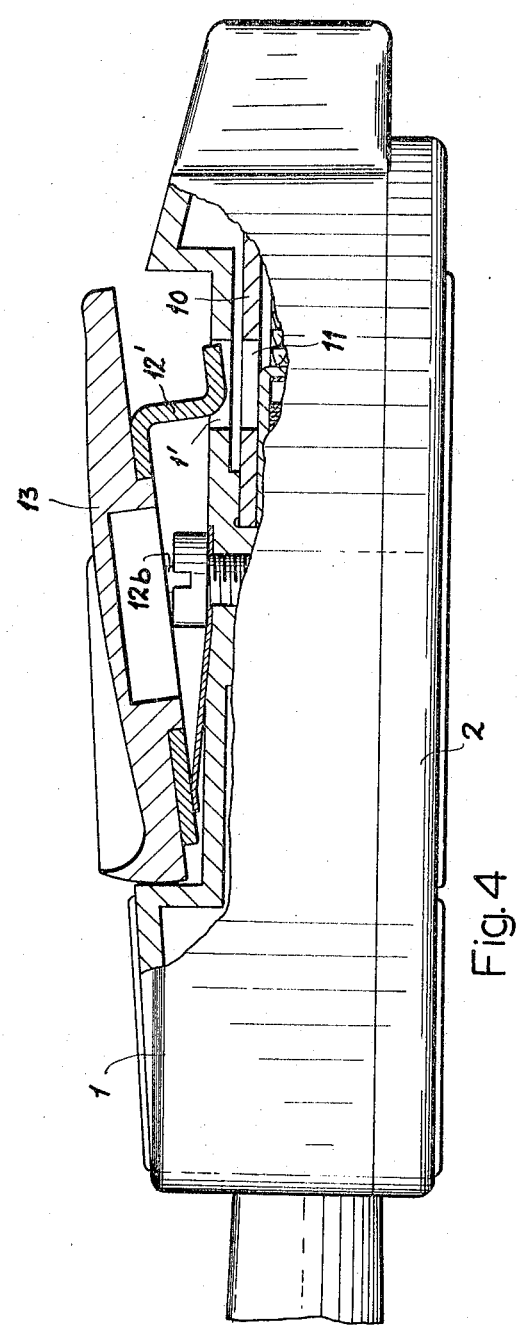

BY Karl F. Ross
Attorney

United States Patent Office 3,318,288
Patented May 9, 1967

3,318,288
DOG-LEASH ASSEMBLY
Herbert Müllritter, Lauscher Strasse 41, Duren, Germany
Filed Apr. 6, 1966, Ser. No. 540,563
Claims priority, application Germany, Apr. 7, 1965,
K 50,820
10 Claims. (Cl. 119—109)

My present invention relates to an assembly comprising a dog leash and a control device therefor by which the effective length of the leash can be altered.

The general object of my invention is to provide an assembly of this type which is of simple construction, long life and sturdy build, and which can be easily manipulated.

A more particular object of this invention is to provide a control device having only a small number of relatively movable parts.

The foregoing objects are realized, in accordance with my invention, by the provision of a pillbox-shaped housing which has a peripheral exit slot for the leash and wherein a reel is rotatable about a central stud, the reel being urged by a coil spring into a predetermined starting position in which the leash is wound around it so as to be fully retracted into the housing; such retraction, however, is normally prevented by the engagement of a detent in an eccentric perforation of a disk rigid with the reel, the detent being part of a control member which is swingable about a pair of rocker feet held in position by a flat spring which also bears upon the control member in such a manner as to bias it toward a position in which the detent enters the perforation for releasably arresting the reel.

A device of this description is advantageously made substantially entirely from metal, e.g. zinc or aluminum with the stud cast as an integral part of the housing. The leash, which may be a nylon fabric, can be anchored to the reel by being threaded through two or more pairs of circumferentially juxtaposed open-ended slits formed, advantageously, in the peripheral wall of one of two complementary, generally cup-shaped halves constituting the reel, the other (inner) half having gaps which span the slots of each pair to clamp the least in position. The latter half, which is axially slidable into the first half along the stud, preferably is provided with an inturned central flange slidably engaging this stud to prevent binding and excessive wear. The last of the slits, i.e. the one around which the leash will flex upon being withdrawn as far as possible from the housing, may be provided with a special U-profile strip to protect its contact edge and to prevent that edge from cutting into the leash.

Other features of my invention will become more fully apparent from the following description of a preferred embodiment, reference being made to the accompanying drawing in which:

FIG. 1 is a longitudinal sectional view of a control device for a leash according to the invention;

FIG. 4 is a view similar to FIG. 1, showing the control mechanism in a released position.

Figure 2:
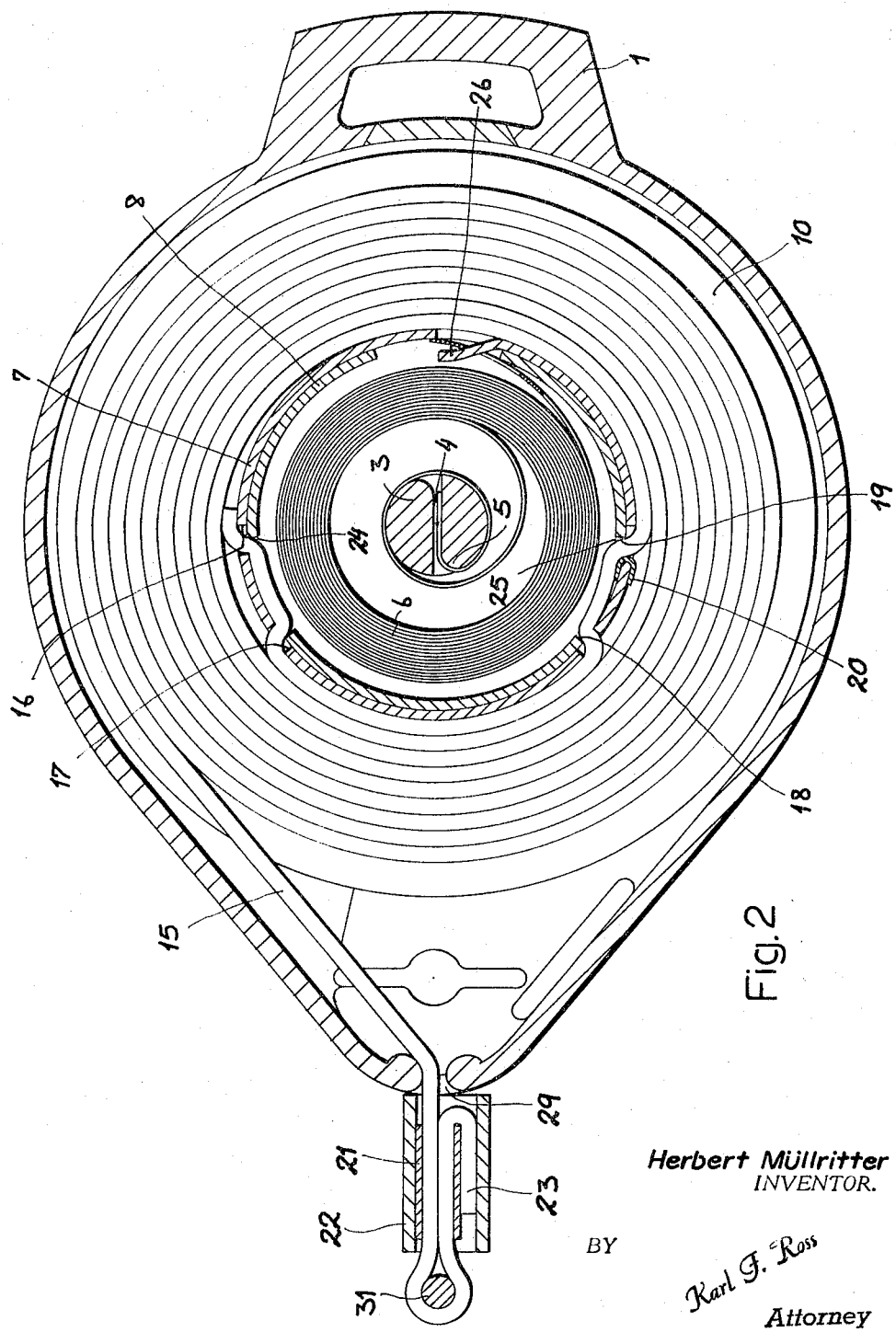
FIG. 2 is a bottom view of the control mechanism of the leash, taken substantially on the line II—II of FIG. 1.
Figure 3:
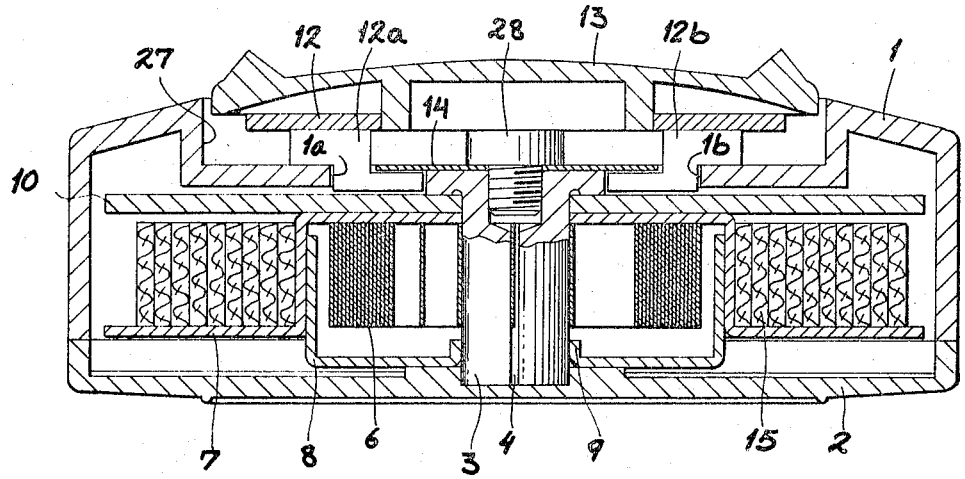
FIG. 3 is a cross-sectional view of the device taken on the line III—III of FIG. 1.

The assembly shown in the drawing comprises a leash 15 and a control device therefor, the latter including a metallic casing 1 of pillbox shape made integral with a stud 3 and provided with a detachable bottom part 2. The two housing parts 1, 2 may be joined to each other by any suitable fastening means not shown.

Figure 5:
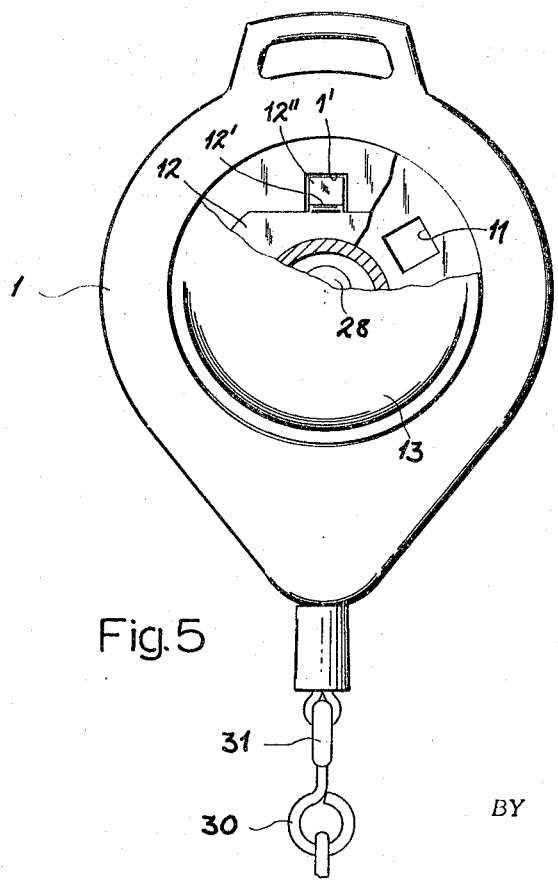
FIG. 5 is a top view of the device with parts broken away to expose underlying structure.

Stud 3 has an axial slot 4 with a rounded edge 5 around which an extremity of a coil spring 6 is bent so as to be securely anchored to that stud. The opposite extremity of the coil spring is hooked onto an inwardly bent lug 26 stamped from the peripheral wall of a generally cup-shaped element 7 which forms one half of a reel rotatable about the stud 3. The other half of the reel is a complementary cup-shaped element 8 which slides into element 7 along stud 3, an inturned central flange 9 of element 8 slidably engaging this stud. The two reel halves 7, 8 may be made of sheet metal, the outer half 7 having secured to it—preferably by spot welding—a metallic disk 10 provided with several angularly spaced eccentrically positioned perforations 11. These perforations register, in different angular positions of reel 7, 8, with an aperture 1' in a wall of housing part 1 which forms a recess 27 for a knob-shaped control member 13. The knob 13 is rigid with a lever 12, as by being adhesively bonded thereto, which at 12' forms an arm extending through aperture 1' in the direction of the reel axis; arm 12' terminates in a tongue 12" bent radially outwardly, this tongue being of substantially rectangular outline conforming to that of the perforations 11 (see FIG. 5) for the purpose of engaging in any one of these perforations with broad surface contact to arrest the reel 7, 8 against the restoring force of its coil spring 6 after the leash 15, anchored to the reel, has been partly or completely withdrawn from the housing 1. Advantageously, disk 10 and lever 12 are case-hardened to increase their useful life.

Two other openings 1a, 1b on the bottom of recess 27 accommodate a pair of rocker feet 12a, 12b of lever 12 which are annularly bent inwardly toward the axis of stud 3 and are overlain by respective edge portions of a flat spring 14 secured to the casing 1 by a screw 28 which is threaded into the stud 3 centrally of recess 27. While the spring 14 thus serves to retain the lever 12 and the knob 13 on the casing 1, it simultaneously acts to hold the knob and lever in a position (FIG. 1) in which tongue 12" enters one of the perforations 11; spring 14 does so by bearing upon the underside of knob 13, through the intermediary of lever 12, by a raised portion 14' which is located on the opposite side of detent 12' with reference to an imaginary line interconnecting the two rocker feet 12a, 12b.

By the arrangement just described it is possible to swing the knob 13 into an alternate position, shown in FIG. 4, in which tongue 12" is withdrawn from disk 10 so that reel 7, 8 is free to rotate under the control of the counteracting force of coil spring 6 and of the pull exerted upon the free end of leash 15 by the user or by a dog tied thereto.

The attachment of the free end of leash 15, projecting from housing 1 via an exit slot 29 (FIG. 2), to a dog collar (not shown) takes place in the usual manner with the aid of a swivel hook 30. The end 23 of the leash 15, threaded through a mounting ring 31 of this hook, is wound back and forth in three plies with interposition of a metal clip 21, these plies together with the clip being clamped tightly in a flat frustopyramidal sleeve 22.

The inner end of the leash is secured to the reel 7, 8 by being threaded through open-ended slits 16, 17, 18 and 19 of cup member 7, the pairs of closely spaced slits 16, 17 and 18, 19 being spanned by gaps 24, 25 in the peripheral wall of cup member 8 whereby the leash is held firmly in place by frictional engagement with parts 7 and 8. A contact edge of slit 25, along which the leash 15 is subject to maximum wear by bending back and forth in a fully unreeled state, is sheathed by a protective strip 20 bent into a U-profile.

I claim:

1. A dog-leash assembly comprising a leash, a pillbox-shaped housing having a peripheral exit slot for said leash, a central stud in said housing, a reel rotatable about said stud within said housing, a coil spring anchored to said stud and to said reel while surrounding said stud for tending to hold said reel in a predetermined starting position in which said leash is wound therearound and fully retracted into said housing, a disk rigid with said reel and transverse to the axis thereof, said disk being provided with at least one eccentric perforation, said housing having an aperture aligned with said perforation in a predetermined angular position of said reel, a control member provided with rocker feet and with a detent penetrating said aperture, said member being accessibly disposed on the outside of said housing, and a flat spring secured to said housing and engaging said rocker feet for retaining said member on said housing and biasing it toward a position in which said detent engages in said perforation, thereby releasably arresting said reel.

2. An assembly as defined in claim 1 wherein said stud is integral with said housing.

3. An assembly as defined in claim 1 wherein said stud has an axial slot with a rounded edge receiving an extremity of said coil spring.

4. An assembly as defined in claim 1 wherein said reel consists of two generally cup-shaped halves, one of said halves being rigid with said disk, the other of said halves fitting slidably into the first half and being provided with an inturned central flange slidably engaging said stud.

5. An assembly as defined in claim 1 wherein the reel includes first and second halves, said first half has a peripheral wall provided with a plurality of juxtaposed pairs of circumferentially juxtaposed open-ended slits, said leash being anchored to said reel by being threaded through said slits, said other of said halves having gaps spanning said pairs of slits for clamping said leash in position.

6. An assembly as defined in claim 5 wherein the last one of said slits has a contact edge reinforced by a U-profile strip.

7. An assembly as defined in claim 1 wherein said detent is a substantially axially extending arm with a radially outwardly bent tongue of generally rectangular outline fitting into said perforation, the latter being of conforming generally rectangular outline.

8. An assembly as defined in claim 1 wherein said leash has a free end, projecting outwardly from said slot, threaded through a coupling ring and wound back and forth in three plies with interposition of a metal clip, further comprising a retaining sleeve embracing said plies and said clip.

9. An assembly as defined in claim 1 wherein said housing is formed with an external recess receiving said member, said flat spring being secured to said housing substantially centrally of said recess.

10. An assembly as defined in claim 9 wherein said casing has openings on the bottom of said recess partly overlain by opposite edge portions of said flat spring, said rocker feet entering said opening underneath said edge portions, said detent extending from said member on one side of an imaginary line interconnecting said rocker feet, said flat spring bearing upon said member on the opposite side of said imaginary line.

References Cited by the Examiner

UNITED STATES PATENTS

| | | | |
|---|---|---|---|
| 2,776,644 | 1/1957 | Fontaine | 119—109 |
| 2,919,676 | 1/1960 | Schneider | 119—109 |
| 3,233,591 | 2/1966 | Rogers et al. | 119—109 |

SAMUEL KOREN, *Primary Examiner.*

HUGH R. CHAMBLEE, *Examiner.*